United States Patent
Cox et al.

(10) Patent No.: US 9,544,139 B2
(45) Date of Patent: Jan. 10, 2017

(54) METHOD AND APPARATUS FOR A NON-DETERMINISTIC RANDOM BIT GENERATOR (NRBG)

(75) Inventors: George W. Cox, Lake Oswego, OR (US); David Johnston, Hillsboro, OR (US); Martin G. Dixon, Portland, OR (US); Stephen A. Fischer, Gold River, CA (US); Jason W. Brandt, Austin, TX (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/976,175

(22) PCT Filed: Dec. 29, 2011

(86) PCT No.: PCT/US2011/067920
§ 371 (c)(1),
(2), (4) Date: Aug. 29, 2014

(87) PCT Pub. No.: WO2013/101101
PCT Pub. Date: Jul. 4, 2013

(65) Prior Publication Data
US 2015/0055778 A1    Feb. 26, 2015

(51) Int. Cl.
*H04L 9/00* (2006.01)
*H04L 9/08* (2006.01)
(Continued)

(52) U.S. Cl.
CPC ............. *H04L 9/0869* (2013.01); *G06F 7/588* (2013.01); *G06F 9/30007* (2013.01);
(Continued)

(58) Field of Classification Search
CPC ............ G06F 7/588; G06F 7/58; G06Q 20/12; H04L 9/0869
(Continued)

(56) References Cited

U.S. PATENT DOCUMENTS 5,963,104 A * 10/1999 Buer ................. G06F 7/588
331/78
6,792,438 B1 * 9/2004 Wells ................ G06F 7/588
708/250

(Continued)

OTHER PUBLICATIONS

May et al, Non-deterministic Processors, ACIPS 2001, LNCS 2119, pp. 115-129, 2001.*

(Continued)

*Primary Examiner* — Abu Sholeman
(74) *Attorney, Agent, or Firm* — Nicholson De Vos Webster & Elliott LLP

(57) ABSTRACT

A hardware-based digital random number generator is provided. In one embodiment, a processor includes a digital random number generator (DRNG) to condition entropy data provided by an entropy source, to generate a plurality of deterministic random bit (DRB) strings, and to generate a plurality of nondeterministic random bit (NRB) strings, and an execution unit coupled to the DRNG, in response to a first instruction to read a seed value, to retrieve one of the NRB strings from the DRNG and to store the NRB string in a destination register specified by the first instruction.

8 Claims, 10 Drawing Sheets

(51) Int. Cl.
   *H04L 9/06* (2006.01)
   *G06F 7/58* (2006.01)
   *G06F 9/30* (2006.01)
   *G06F 15/16* (2006.01)
(52) U.S. Cl.
   CPC ...... *H04L 9/0662* (2013.01); *G06F 2207/583* (2013.01); *H04L 2209/24* (2013.01)
(58) Field of Classification Search
   USPC ...................................... 380/46, 45; 726/11
   See application file for complete search history.

(56) References Cited

U.S. PATENT DOCUMENTS

| | | | |
|---|---|---|---|
| 7,571,199 B1 | 8/2009 | Field et al. | |
| 8,015,224 B1 | 9/2011 | Chaichanavong et al. | |
| 8,489,660 B2* | 7/2013 | Herbert | G06F 7/588 380/240 |
| 2003/0196111 A1 | 10/2003 | Lampson et al. | |
| 2009/0265112 A1* | 10/2009 | Wilber | B82Y 10/00 702/19 |
| 2010/0332574 A1* | 12/2010 | Herbert | G06F 7/588 708/251 |
| 2011/0075840 A1* | 3/2011 | Zayas | G06F 7/588 380/46 |

OTHER PUBLICATIONS

Ziebart et al, Maximum Entropy Inverse Reinforceement Learning, 2008, aasi.org, pp. 1433-1438.*
Taiwan Application No. 101149297, Notice of Allowance, dated Mar. 27, 2015, 2 pages.
International Search Report mailed Sep. 26, 2012, for International Application No. PCT/US2011/067920, 9 pages.
U.S. Department of Commerce, "Recommendation for Random Number Generation Using Deterministic Random Bit Generators (Revised)," Technology Administration, National Institute of Standards and Technology, NIST Special Publication 800-90, Mar. 2007.
U.S. Department of Commerce, "Recommendation for Random Number Generation Using Deterministic Random Bit Generators (Revised)," Technology Administration, National Institute of Standards and Technology, NIST Special Publication 800-90A, Rev 1, May 2011.
U.S. Department of Commerce, "Security Requirements for Cryptographic Modules" Information Technology Laboratory, National Institute of Standards and Technology, Gaithersburg, MD, FIPS PUB 140-2, Change Notices (Dec. 3, 2002), May 25, 2001.
Office Action from foreign counterpart Taiwan Patent Application No. 101149297 mailed Sep. 16, 2014, 28 pages.
PCT International Search Report for PCT Counterpart Application No. PCT/US2011/067920, 3 pgs., (Sep. 26, 2012).
PCT Written Opinion of the International Searching Authority for PCT Counterpart Application No. PCT/US2011/067920, 4 pgs., (Sep. 26, 2012).
PCT Notification concerning Transmittal of International Preliminary Report on Patentability (Chapter I of the Patent Cooperation Treaty) for PCT Counterpart Application No. PCT/US2011/067920, 6 pgs., (Jul. 10, 2014).
"Security Requirements for Cryptographic Modules," Federal Information Processing Standards, Dec. 3, 2002, 69 pages.
Barker, Elaine, "Recommendation for Random Number Generation Using Deterministic Random Bit Generators (Revised)," Mar. 2007, 133 pages.
Jun, et al., "The Intel Random Number Generator," Apr. 22, 1999, 8 pages, found in www.cryptography.com/resources/whitepapers/IntelRNG.pdf.
Hofemeir, G. "Find out about Intel's new RdRand instruction: Intel Developer Zone," Jun. 22, 2011, 2 pages, found in https://software.intel.com/en-us-blogs/2011/06/22 find-out-about-intels-new-rdrand-instruction.
European Search Report in corresponding matter, PCT2011/067920, dated Sep. 7, 2015, 11 pages.

\* cited by examiner

METHOD AND APPARATUS FOR A NON-DETERMINISTIC RANDOM BIT GENERATOR (NRBG)

CROSS-REFERENCE TO RELATED APPLICATION

This patent application is a U.S. National Phase Application under 35 U.S.C. §371 of International Application No. PCT/US2011/067920, filed Dec. 29, 2011, entitled METHOD AND APPARATUS FOR A NON-DETERMINISTIC RANDOM BIT GENERATOR (NRBG).

FIELD

This disclosure relates to processors and in particular to random number generators in processors.

BACKGROUND

Cryptographic algorithms and the protocols that use them require keys (which are based upon random numbers). For example, such keys can be secret/shared keys used by symmetric key algorithms such as Advanced Encryption Standard (AES) and Data Encryption Standard (DES) (used for block or stream encryption) and public/private key pairs used by asymmetric key algorithms such as Riverst, Shamir, Adleman (RSA) and Digital Signature Algorithm (DSA).

Random numbers are created by a random number generator. There are logically two kinds of random number generator: a True Random Number Generator (TRNG) and a Pseudo Random Number Generator (PRNG).

A TRNG can only be built using a HW-based "entropy source" and can produce a nondeterministic sequence of truly random numbers. The TRNG is often used to "seed" software PRNGs and is also known as a Nondeterministic Random Bit Generator (NRBG). The lack of high quality, high performance true TRNGs has resulted in computer system security failures.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

"Securing" anything on a computer requires use of high quality cryptography which requires high quality keys. High quality keys require high quality random numbers/entropy. High quality random numbers/entropy requires a high quality Entropy Source (in hardware) and high quality (e.g., standards compliant) post processing certified as such (for example, via Federal Information Processing Standards Publication, FIPS PUB 140-2/3 Level 2).

High quality keys are foundational enablers of all cryptographic usages including: communications—all levels of all stacks (Extensible Markup Language (XML), Transport Layer Security (TLS), Virtual Private Network (VPN), Internet Protocol (IP), WiFi, WiMax); Signing—digital certificates, integrity manifests, attestation, transactions; Storage—file and volume privacy; and Digital Rights Management (DRM). Accumulating and processing entropy of sufficient quantity and quality to (re)seed PRNG/DRNG is a complicated, time consuming, and error prone activity in computing systems. Thus, computing systems do not have adequate quantities of high quality entropy. An embodiment of a Nondeterministic Random Bit Generator (NRBG) to generate high quality entropy is provided. In an embodiment the NRBG is a standards compliant hardware NRBG that is integrated in a processor or a core of a processor. In an embodiment, a software interface is provided to allow the NRBG to be controlled via a processor instruction.

Figure 1A:
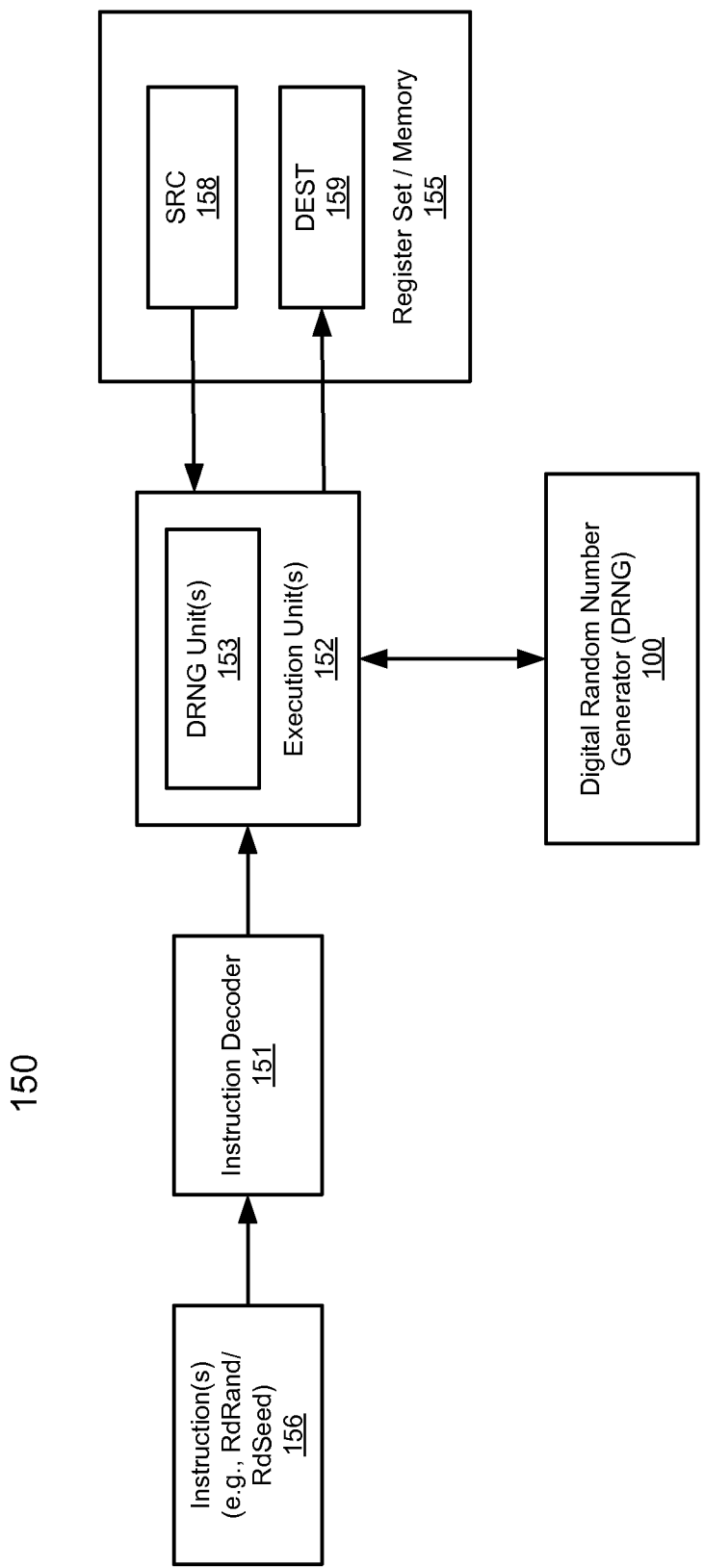
FIG. 1A is a block diagram illustrating a processor having a hardware random number generator according to one embodiment of the invention.

FIG. 1A is a block diagram illustrating an example of a processor according one embodiment. Referring to FIG. 1A, processor 150 may represent any kind of instruction processing apparatuses. For example, processor 150 may be a general-purpose processor. Processor 150 may be any of various complex instruction set computing (CISC) processors, various reduced instruction set computing (RISC) processors, various very long instruction word (VLIW) processors, various hybrids thereof, or other types of processors entirely. In one embodiment, processor 150 includes instruction decoder 151 to receive and decode instruction 156. Instruction decoder 151 may generate and output one or more micro-operations, micro-code, entry points, microinstructions, other instructions, or other control signals, which reflect, or are derived from, instruction 156. Instruction decoder 151 may be implemented using various different mechanisms. Examples of suitable mechanisms include, but are not limited to, microcode read only memories (ROMs), look-up tables, hardware implementations, programmable logic arrays (PLAs), and the like.

Processor 150 further includes one or more execution units 152, which may include an arithmetic logic unit, or another type of logic unit capable of performing operations based on instruction 156. As a result of instruction decoder 151 decoding instruction 156, execution unit 152 may receive one or more micro-operations, micro-code entry points, microinstructions, other instructions, or other control signals, which reflect, or are derived from, instruction 156. Execution unit 152 may be operable as a result of instruction 156 indicating one or more source operands (SRC) 158 and to store a result in one or more destination operands (DEST) 159 of register set 155 indicated by instruction 156. Execution unit 152 may include circuitry or other execution logic (e.g., software combined with hardware and/or firmware) operable to execute instructions or other control signals derived from instruction 156 and perform an operation accordingly. Execution unit 152 may represent any kinds of execution units such as logic units, arithmetic logic units (ALUs), arithmetic units, integer units, etc.

In one embodiment, instruction 156 may implicitly indicate and/or explicitly specify (e.g., through one or more dedicated fields or sets of bits) the source and destination operands. Examples of suitable sources and/or destination of the operands include registers, memory, immediate of the instruction, and combinations thereof. In various embodiments, the source and destination operands may be 8-bit, 16-bit, 32-bit, or 64-bit operands, although this is not required.

In one embodiment, some or all of the source and destination operands may be stored in registers of a register set or memory 155. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

According to one embodiment, processor 150 includes digital random number generator (DRNG) 100 to generate a deterministic random bit stream or string and/or a nondeterministic random bit stream or string. Execution init 152 further includes a DRNG unit 153, for example, having corresponding microcode, to execute an instruction to obtain a random number (e.g., RDRAND instruction) or a random seed number (e.g., RESEED instruction). In one embodiment, DRNG 100 includes a deterministic random bit generator (DRBG) and a nondeterministic random bit generator (NRBG), which will be described in details further below.

Figure 1B:
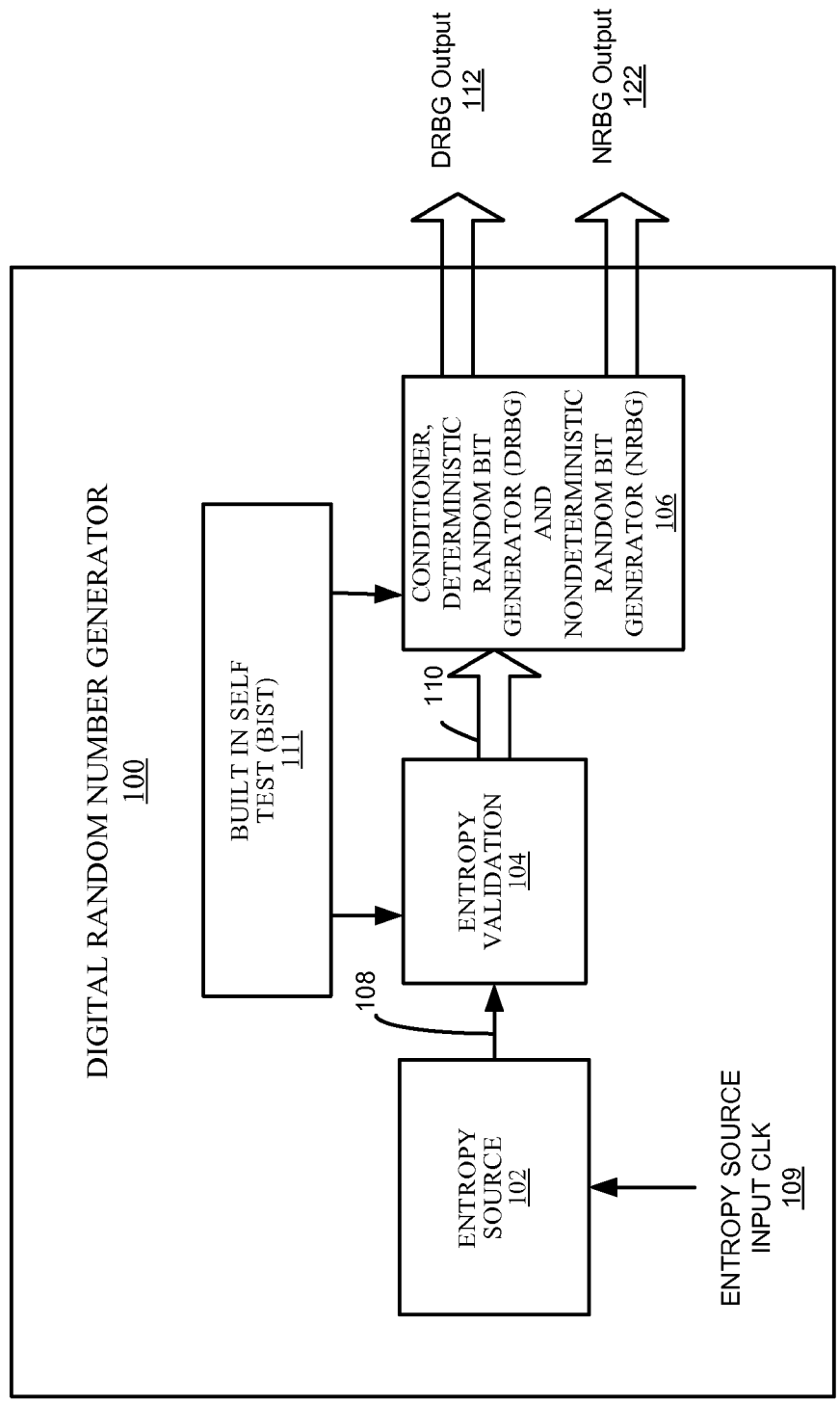
FIG. 1B is a block diagram of an embodiment of a hardware random number generator that includes a Nondeterministic Random Bit Generator (NRBG) according to the principles of the invention.

FIG. 1B is a block diagram of an embodiment of a hardware random number generator 100 according to some embodiments of the invention. Referring to FIG. 1B, digital random number generator (DRNG) 100 includes a logically asynchronous pipeline with at least three stages (subunits or modules). In one embodiment, referring to FIG. 1B, the at least three stages include: (1) entropy source 102; (2) entropy validation 104; and (3) Combined Conditioner, Deterministic Random Bit Generator (DRBG) and Nondeterministic Random Bit Generator (NRBG) 106. Note that the combined conditioner, DRBG, and NRBG 106 may be implemented in separate modules, such as, for example, conditioner logic, DRBG logic, and NRBG logic communicatively coupled to one another.

Entropy is a measure of randomness, that is, the degree of disorder or uncertainty in a system. A measure of randomness of a set of bits is a measure of the unpredictability of a next set of bits. In the digital random number generator 100 shown in FIG. 1B, entropy flows from the entropy source module or logic 102 to the entropy validation module 104, and finally to the Combined Conditioner, DRBG and NRBG module 106.

Entropy Source (ES) logic 102 generates partially entropic data. The partially entropic data is output as a stream of random bits and a data valid signal 108 that are synchronous with or driven by an entropy source input clock 109, which may reside within or external to DRNG 100. In an embodiment, the stream of random bits (serial data) 108 output by the entropy source 102 has a minimum entropy greater than a predetermined threshold such as approximately 0.5 bits per bit.

In one embodiment, entropy validation module 104 parallelizes the received stream of random bits (serial partially entropic data) 108 and determines whether the stream of random bits 108 meets a predetermined mathematical model of the entropy source 102 for the expected arrival rate of particular patterns of ones and zeros.

The Combined Conditioner, DRBG and NRBG module 106 provides fully entropic data from the stream of random bits 108 received from the entropy validation module 102. The Combined Conditioner, DRBG and NRBG module 106 (collectively referred to herein as a random bit generator or RBG) uses a predetermined algorithm to produce a sequence of bits from an initial value determined by a seed that is determined from the entropy input to the RBG module 106. An algorithm, referred to herein, is a specified mathematical process for computation, that is, a set of rules that, if followed, will produce a prescribed or defined result. A seed is a string of bits that is used as input to the RBG module 106. The seed determines a portion of the internal state of the DRNG 100, and its entropy is sufficient to support the security strength of the DRNG 100.

Figure 5:
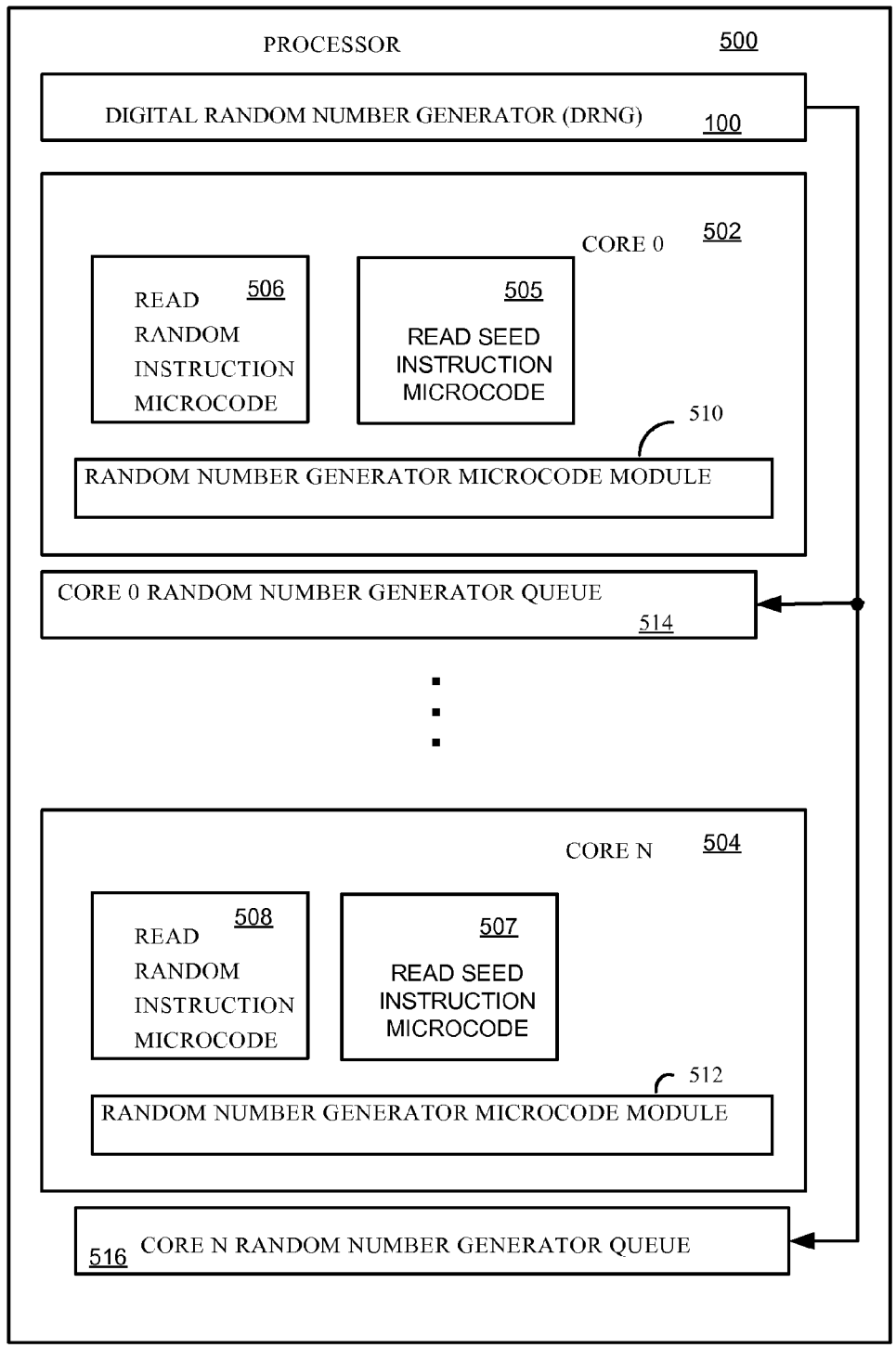
FIG. 5 is a block diagram of an embodiment of a processor having a hardware random number generator shown in FIG. 1.

The Combined Conditioner, DRBG and NRBG module 106 includes an NRBG module and a DRBG module according to some embodiments of the invention. In an embodiment, the NRBG is an Enhanced Nondeterministic Random Number Generator (ENRNG) that is substantially compliant with NIST SP800-90B and SP800-90C. Based upon the adherence of the NRBG to NIST SP800-90B and SP800-90C, an arbitrary sequence of seeds can be appended to each other in arbitrary order to form a bit string of arbitrary length with the resultant bit string having the required prediction resistance properties to meet the (re) seeding needs of an arbitrary width DRBG (e.g., as required to support NIST SP800-90A DRBGs). The DRNG 100, a reusable unit, can be embedded in silicon products as shown in FIG. 5.

In an embodiment, the DRNG 100 includes a Built-in Self Test (BIST) unit (module) 111. The BIST module 111 is used after a power on reset to provide comprehensive test coverage of the entropy validation module 104 and Combined Conditioner, DRBG and NRBG module 106 and to perform health tests on the entropy source 102. In an embodiment, the comprehensive test coverage is performed using BIST Known Answer Tests. In addition, the BIST unit performs signature analysis for manufacturing test.

In an embodiment, the entropy source 102 derives an entropic stream of bits from thermal noise (also called Johnson noise or Nyquist noise) which is a naturally occurring characteristic of electronic circuits and is caused by random thermal movement of electrons in electrically conducting materials. In one embodiment, entropy source 102 uses thermal noise to generate random bit streams.

In one embodiment, RBG module 106 is configured to generate DRBG data 112 and NRBG data 122 based on entropy data 110 received from entropy validation module 104 and/or entropy source 102. According to one embodiment, RBG module 106 includes a DRBG module to generate DRBG data 112 based on entropy data that has been conditioned by a conditioner of RBG module 106. DRBG data 112 may be stored in a DRBG buffer, which can be retrieved subsequently in response to an instruction received by a processor, such as, for example, a RDRAND instruction. In another embodiment, RBG module 106 further includes an NRBG module to generate NRBG data 122 based on the conditioned entropy data and DRBG data 112. NRBG data 122 may be stored in an NRBG buffer, which can be retrieved subsequently in response to an instruction received by a processor, such as, for example, a RDSEED instruction.

Figure 2:
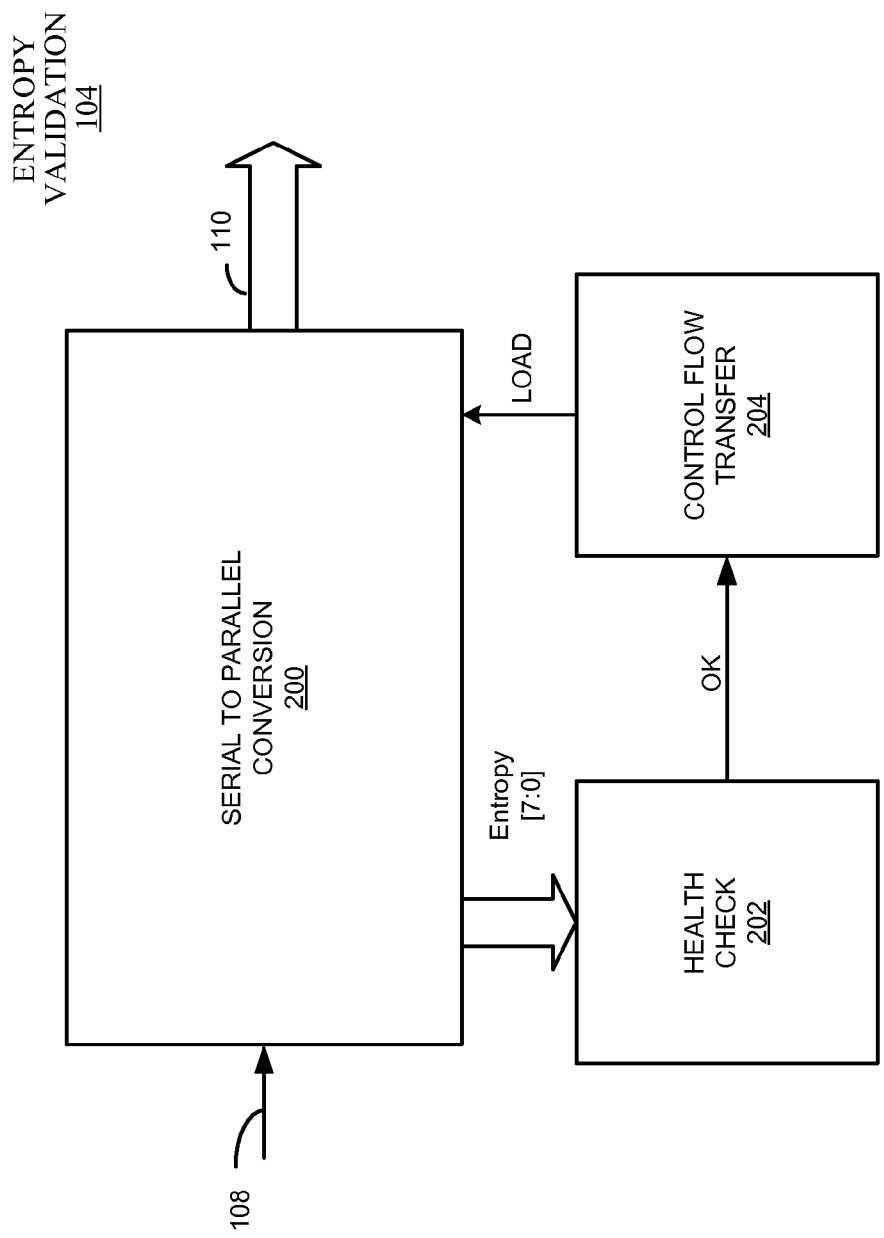
FIG. 2 is a block diagram of an embodiment of the entropy validation module shown in FIG. 1.

FIG. 2 is a block diagram of an embodiment of an entropy validation module 104 shown in FIG. 1B. According to one embodiment, entropy validation module 104 dynamically measures the "fitness" of the entropy source generated "raw" entropy samples to the expected arrival rate/distribution of selected patterns based upon an entropy source model (for example, a mathematical model). In this embodiment, entropy validation module 104 includes a serial-to-parallel converter module 200, a health check module 202 and a control flow transfer module 204.

In one embodiment, serial-to-parallel converter module 200 receives the stream of random bits 108 from the entropy source 102 (FIG. 1B) and converts the stream to one or more 8-bit blocks (bytes) which are then converted again to larger blocks, for example, 128-bit (16 bytes), 256-bit (32 bytes) blocks, or blocks in other sizes.

The health check module 202 performs a test on entropy source internal "raw" output by performing per sample (on one block of data) tests and statistics and M sample sliding window tests and statistics (on M blocks of data). In an embodiment, the health check module 202 counts the occurrences of some bit patterns such as six different bit patterns in each data block (128-bits or 256-bits) and examines whether each of the bit patterns occur within statistical bounds. If they do, the data block is considered as healthy.

For example, in an embodiment, the data block may be examined for the number of occurrences of a predetermined bit pattern such as a 4-bit pattern of "0110." In one embodiment, the bit pattern '0110' may be considered to be within statistical bounds if the number of occurrences of '0110' in a 256-bit data block falls within a predetermined range, such as, for example, between 3 and 34. A number of such patterns may be counted in order to improve the reliability of the statistical test.

If the health check module 202 indicates that the block passed the health check (via the OK signal), the control flow transfer module 204 permits forwarding of the data block 110 to the Combined Conditioner, DRBG and NRBG module 106 (FIG. 1B). In an alternative embodiment only the health status indicator is forwarded for making the determination that a reseed of the DRBG is required.

Figure 3:
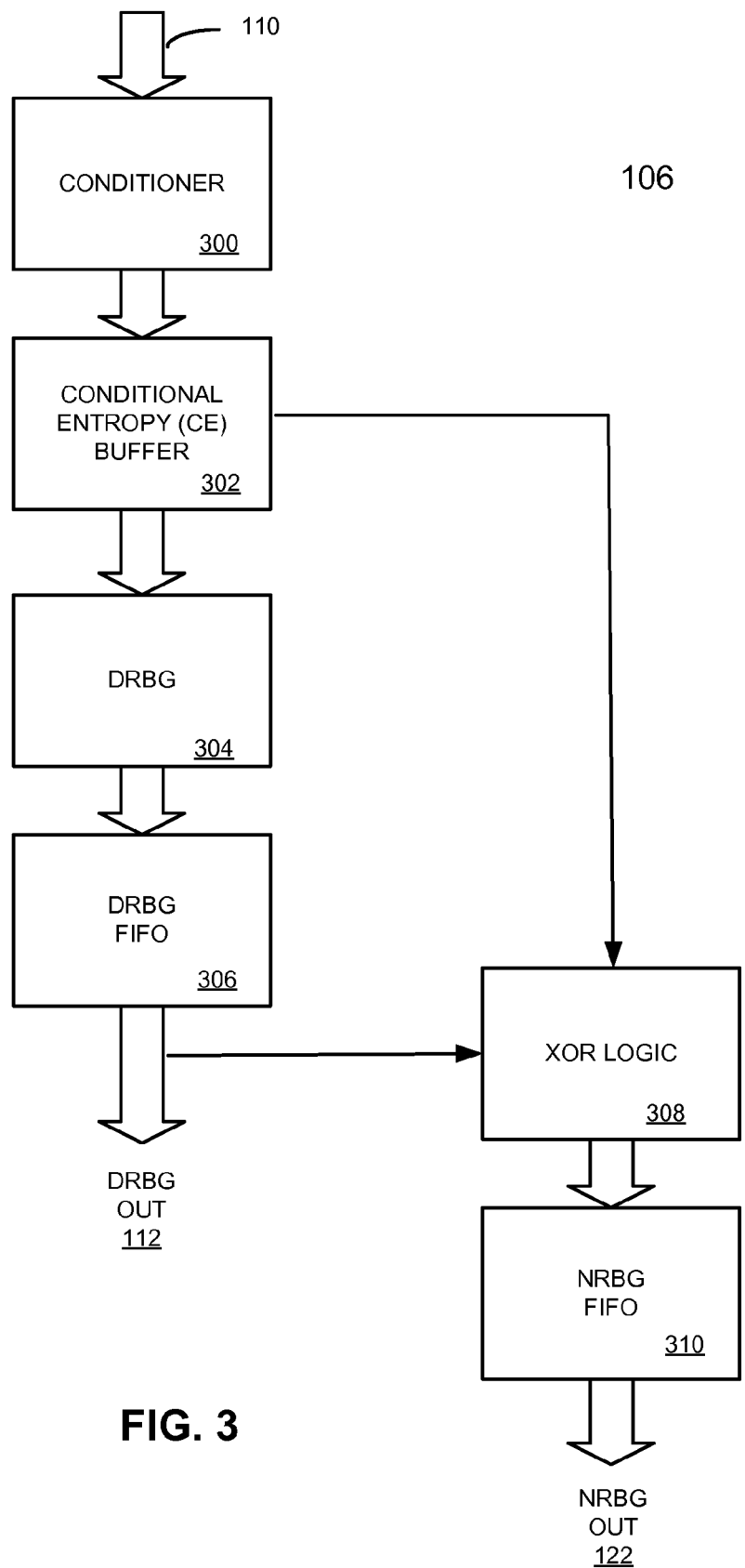
FIG. 3 is a block diagram of an embodiment of the Combined Conditioner, DRBG and NRBG module shown in FIG. 1.

FIG. 3 is a block diagram of an embodiment of the Combined Conditioner, DRBG and NRBG module 106 shown in FIG. 1B. The combined conditioner, DRBG and NRBG module 106 includes a conditioner 300 that receives an output from entropy validation module 104 and/or entropy source 102. The conditioner 300 performs "entropy extraction" and "entropy compression" on the received entropy validation module 104 output and provides a stream of entropic seeds to the DRNG 100. In one embodiment, conditioner 300 is coupled to a conditioned entropy buffer 302 which stores the stream of entropic seeds for use by the DRBG 304.

In one embodiment, module 106 includes DRBG module 304 to generate DRBG data based on conditioned entropy data conditioned by conditioner 300 and stored in conditional entropy buffer 302. DRBG data is then stored in DRBG buffer 306, which can be retrieved by a processor subsequently in response an instruction, such as, for example, an RDRAND instruction.

In one embodiment, the combined conditioner, DRBG and NRBG module 106 includes an NRBG module which includes XOR logic 308 and NRBG buffer 310, which may be, for example, a first-in-first-out (FIFO) buffer. The output of the NRBG FIFO provides NRBG data 122. The XOR logic 308 is coupled to the output of the conditioned entropy buffer 302 and the input of a DRBG 304. The output of the XOR logic 308 is coupled to the input of NRBG FIFO 310. NRBG data stored in NRBG buffer 310 may be subsequently retrieved by a processor in response to an instruction, such as, for example, an RDSEED instruction.

When the NRBG FIFO 310 is not full and thus needs to be filled with new values, the DRNG 100 takes one of the seeds stored in the conditioned entropy buffer 307 and an output from the DRBG output FIFO 306 and performs an XOR operation on them via XOR logic 308. The DRNG 100 stores the result of the XOR operation in the NRBG FIFO 310. The conditioned seed may be a pure entropic value. XORing such a seed with the output from the DRBG 304 provides a safety net, where if the output of the entropy source 102 or conditioner 300 momentarily deviates from pure randomness, due to some transient error, the DRNG 100 ensures that the quality of the NRBG data output from the NRBG FIFO cannot fall below that of the output quality of the DRBG. This is consistent with the requirements of SP800-90C.

In an embodiment, an NRBG output interface is added to the DRNG 100 with the same signaling protocol as the DRBG interface to provide external access to the NRBG output data 310. In one embodiment, the NRBG output data 301 is made available to consumers via a 64 bit data register that is accessible over the bussing structure between DRNG and consumers (for example, the Intel On-Chip System Fabric (IOSF)). The values for this register are sourced from the DRNG 100 via the NRBG interface to the NRBG FIFO 310.

The combination of NIST SP800-90B and SP800-90C compliant NRBG functionality and a FIPS boundary around it supports extended "white box" certification (e.g., via FIPS PUB 140-2) of the DRNG 100. A "FIPS boundary" is a HW enforced set of interlocks that, when in effect, preclude any external access (e.g., via reads/writes over external busses) to the internal state of the DRNG (e.g., register contents or state machine 400 values). The "FIPS boundary" can be forced into effect via external HW fuse state.

Figure 4:
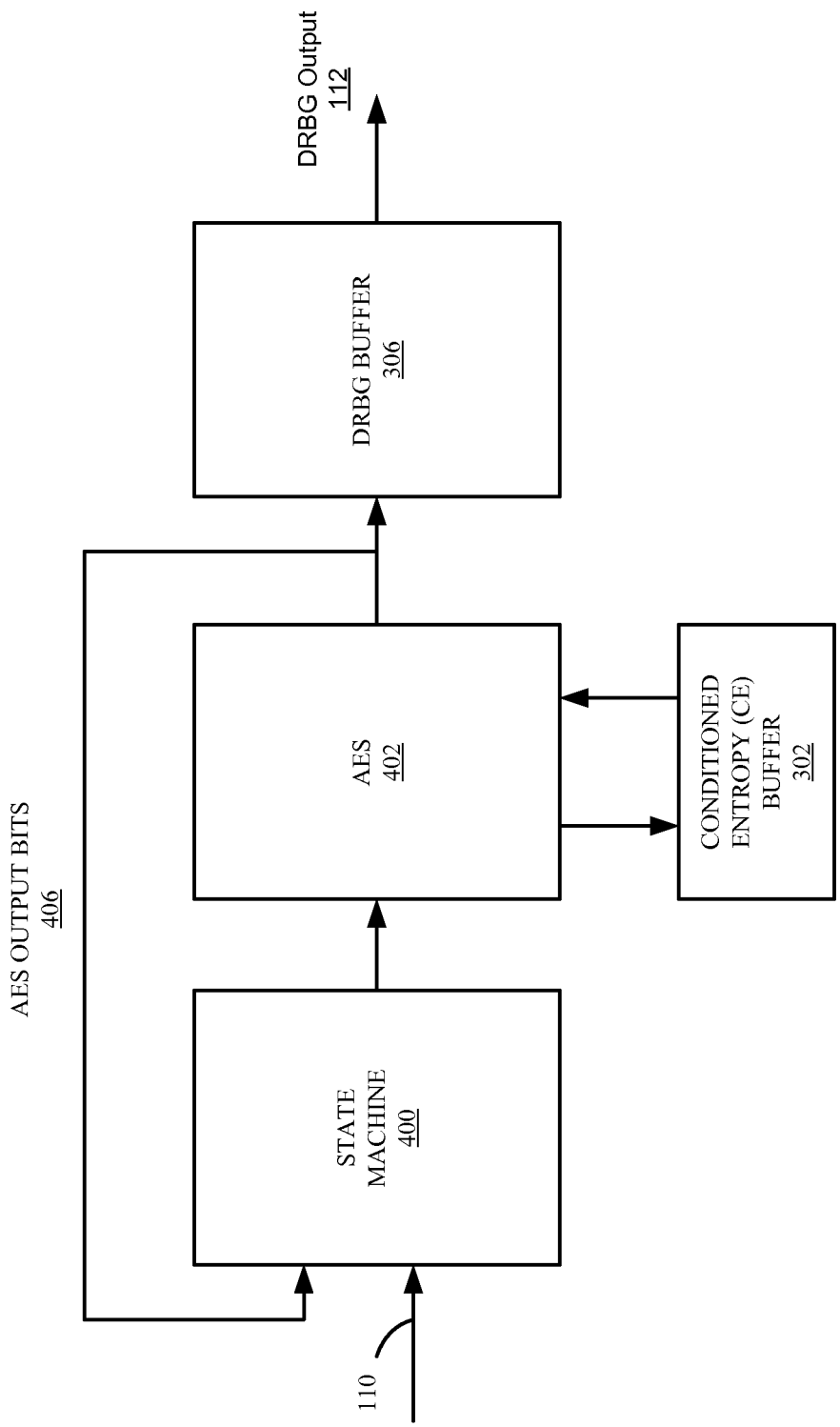
FIG. 4 is a block diagram of an embodiment of a deterministic random number generator shown in FIG. 1.

FIG. 4 is a block diagram of an embodiment of the deterministic random number generator 306 shown in FIG. 3. The deterministic random number generator includes a state machine 400, an Advanced Encryption Standard (AES) module 402, an output buffer 306 and a conditioned entropy (CE) buffer 302. The states in the state machine include reseed, generate, and condition. In the generate state, the AES function is used to generate an output using the current internal state of the dynamic random bit generator and a new internal state is generated for the next request. In the reseed function, a new entropy input is acquired and combined with the current internal state to create a new seed and a new internal state.

In an embodiment, the Combined Conditioner, DRBG and NRBG module 106 provides fully entropic data using AES. AES published by the National Institute of Standards and Technology (NIST) as FIPS 197 is a symmetric block cipher that can be used to encrypt and decrypt a block of data. Two blocks (128-bit or 256-bit blocks) of received partially entropic data are used by the DRBG module 104 while in the condition mode to provide a smaller quantity of fully entropic data. The AES encryption module 402 conditions entropy with AES in CBC-MAC mode and extends entropy via AES counter (CTR) mode.

The state machine 400 controls state variables, working variables, the AES module 402 and the inputs and outputs of the DRBG. The state machine 400 includes an initialize, reseed, generate and condition mode. The AES encryption (cipher) module 402 performs a series of transformations using a secret key (cipher key) to transform intelligible data referred to as "plaintext" into an unintelligible form referred to as "cipher text."

In an embodiment each 256-bit block received from the entropy validation module 104 is conditioned using an AES-CBC-MAC mode construct. The conditioned entropy buffer 302 is provided for accumulating a pool of entropy from several "raw" entropy source samples from which entropy is extracted for (re)seeding the DRBG 106 (FIG. 1B). In an embodiment, a 256-bit "conditioned" entropy output sample is generated from two 256-bit unconditioned samples received from the entropy validation module 104. A 256-bit output 112 may be generated using an AES-CTR mode construct.

In addition to generating a "random number," the digital random number generator 100 is a "randomly behaving" (or nondeterministically behaving) random number generator. Nondeterministic behaviors, beyond the nondeterminacy of the bit sequence generated by the entropy source 102, add to the overall unpredictably of the output entropic bit stream 112. In an embodiment, a set of nondeterministic behaviors provided by the digital random number generator 100 includes temporal asynchrony, entropy source "extra" bits, entropy measurement and autonomous digital random number generator reseeding. These nondeterministic behaviors will be described in greater detail below.

Each subunit (module) of the digital random number generator 100, that is, entropy source module 102, entropy validation module 104 and conditioner and Combined Conditioner, DRBG and NRBG module 106 operate asynchronously to each other. Thus, the digital random number generator 100 is logically a three stage/subunit (module) asynchronous production pipeline. Each module has a logical "output queue" between the module and the next downstream module for "flow control" purposes. Therefore, there is unpredictable dynamic synchronization dependent on the production rate of the upstream module and the consumption rate of the next downstream module, that is, there is temporal asynchrony between modules.

In an embodiment, the entropy source 102 outputs a highly entropic output bit stream, for example, greater than 0.9 bits of entropy per output bit. As discussed earlier, the entropy source runs asynchronously relative to the other modules in the digital random access generator.

In an embodiment the frequency of the entropy source input clock 109 for the entropy source module 102 is greater than the frequency of a clock input to the other modules. Thus, the entropy source module 102 can produce an internal entropic bit stream at several times the clock rate of the other modules (logic), for example, 2-5 times as fast. This allows a subset of the bits from the internal entropic bit stream output from the entropy source module 102 to be selected by a synchronization mechanism for use. Thus, the bits selected from the entropy source's internal entropic bit stream are unpredictable.

For example, in one embodiment, one of every predetermined bits (e.g., one of every three bits or one of every five bits) generated by the entropy source module 102 may be selected, while the other ("extra") bits may be discarded (dropped). In another embodiment, an Exclusive OR (XOR) operation is performed on the extra bits and the result of the XOR operation is forwarded in the selected output bit stream. Thus, the number of bits selected to be forwarded from the entropy source 102 is dependent on the frequency of the digital logic sampling clock relative to frequency of the entropy source clock.

As discussed earlier, based on a mathematical module of the entropy source 102, there are expected occurrence rates or distributions of selected bit string patterns in the entropic bit stream output by the entropy source module 102. The entropy validation module 104 dynamically measures the Entropy Source's entropic bit stream for compliance to the model.

Per sample tests/statistics and per M sample window tests/statistics are used. In an embodiment, entropy measurement based on per sample tests/statistics is performed using certain bit patterns such as 1, 2, 3, and/or 4 bit patterns, applied to moving bit sequence windows to accumulate occurrence/distribution statistics across each 256-bit entropy source output sample. Acceptability count/statistics ranges per pattern are derived from expected distributions based upon the mathematical model and continually repeated one sample after another.

In an embodiment, entropy measurement using per M sample window tests/statistics is performed using a long window M (64K bits=256 samples of 256 bits/samples). The window is dynamically moved back in time (most recent M samples) and continually repeated (one sample after another). The measurement of output goodness is N of M samples "passed" per sample tests, with N chosen empirically from simulations and test chip behavior.

Based upon configuration parameters of both the per sample expected occurrence rates or distributions of selected bit string patterns and N (from N of M) recent "passing" samples, the number of samples from the entropy source 102 forwarded to the deterministic random bit generator 106 prior to a conditioning operation and (subsequently) a reseeding operation varies based upon the dynamic fit of the entropy source samples to the model's distribution curve.

Generating too many outputs using the same seed may provide sufficient information for predicting future outputs. Reseeding is a method to acquire additional bits with sufficient entropy for the desired security strength. A dynamic random bit generator 106 may be periodically reseeded. Thus, periodic reseeding may be used to reduce security risks. Typically, a seed has a finite seed life, that is, the number of outputs produced during a predefined time period.

In contrast to performing periodic reseeding, in one embodiment, the deterministic random number generator 106 is reseeded as often as is convenient without interfering with consumption from the deterministic random number generator 106. The ability to reseed is based upon the relative performance advantage of the entropy source 102, that is, the number of bits per second of the serial stream produced by the entropy source 102.

Thus, another nondeterministic behavior is autonomous DRBG Reseeding. Based upon configuration parameters, the deterministic random bit generator 106 autonomously requests that it be reseeded. The "freshness" of the entropy pool in the deterministic random bit generator 106 is an indicator as to the likely quality of entropy of the output of the deterministic random bit generator 106. Autonomous reseed enabling is controlled by running measurements of the "quality" of entropy being produced by the entropy source 102 and the deterministic random bit generator's entropy state "freshness." The "freshness" of the entropy is based on whether the entropy has its original qualities unimpaired.

In AES CTR mode, during reseed events in the Deterministic Random Bit generator 106, conditioned entropy stored in the conditioned entropy buffer 605 is used in the output generation. In one embodiment, the reseed occurs whenever there are no requests to generate and the Digital Random Number generator has filled all available memory (for example, external queues) for storing random numbers before "turning itself off." In another embodiment, the reseed occurs when a count-based limit on entropy "staleness" generated by the deterministic random number generator 106 is exceeded and given that the conditioner guarantees that if its inputs have >0.5 bit/bit entropy, the conditioner's output for reseeding the deterministic random bit generator 106 is 1.0 bit/bit entropy.

When invoked, in response to the "(re)seed request, the state machine in the deterministic random bit generator 106 enters the reseed state. In the reseed state, the autonomous reseed enabling criteria tests are performed. These tests include successfully passing two entropy source samples (512 bits) through the entropy source measurement tests to the conditioner, successfully applying the N of M quality criteria to each sample to qualify it and the long term/recent state of the entropy source and accumulating unqualified ES outputs (before or after either of the qualified ES outputs) in the conditioner (irrespective of the entropy source measurement state). After two qualified ES samples (512 bits) have been successfully passed to the conditioner, the request from the deterministic random bit generator 106 for "(re)seeding" (requiring 256 bits) is satisfied by the conditioner.

FIG. 5 is a block diagram of an embodiment of a processor 500 that includes one or more cores (processor cores) 502, 504 and the digital random number generator (DRNG) 100 shown in FIG. 1. In the embodiment shown in FIG. 5, each of the processor cores 502, 504 includes Read Random Instruction microcode 506, 508, Read Seed Instruction microcode 505,507, and Random Number Generator (RNG) microcode (μCode) 510, 512. DRNG 100 automatically fills a processor core-specific RNG Queue 514, 516 to service μCode random number requests for that core 502, 504. The Combined Conditioner, DRBG and NRBG module 106 in the DRNG 100 generates the final random numbers that are loaded into the RNG Queues 514, 516.

In an embodiment, the DRBG can be implemented using a variety of NIST approved algorithms (e.g., AES, SHA-256). In an embodiment, the DRBG is a Deterministic Random Number Generator (DRBG) that is compliant with NIST SP800-90A. In an embodiment, the NRBG is an Enhanced Nondeterministic Random Number Generator (ENRNG) that is compliant with NIST SP800-90B and SP800-90C.

In another embodiment, there can be more than one DRNG 100 to achieve different power or performance requirements, for example, instead of one DRNG 100 shared by one or more processor cores 502, 504, there can be one DRNG 100 per processor core 502, 504. Likewise, the depth of the RNG queue 514, 516 can be varied to achieve different power or performance requirements.

In another embodiment, the RNG queuing mechanism can be split between a shared queue at the output of the DRNG and processor core-specific RNG Queues 514, 516 to achieve different power or performance requirements. In yet another embodiment, instead of having one core-specific RNG Queue 514, 516 per core, there may be a single RNG Queue shared by the processor cores 502, 504.

From a power management perspective, the DRNG 100 and the RNG Queue(s) 514, 516 are outside of the processor core power-well, that is, in logic shared by one or more processor cores 502, 504. Thus, there is no impact to processor core power management operations. Entropy can be "computed ahead" and stored for later consumption. Thus, when sufficient random numbers have been stored in the RNG queue 514, 516, the DRNG 100 can automatically "turn itself off" by turning off the clock in order to save power.

If all of the RNG Queues 514, 516 are full, the clock to the DRNG 100 can be turned off while the clock is still provided to the RNG Queues 514, 516 to allow the RNG Queues 514, 516 to provide random data in response to μCode requests. Upon detecting that the RNG Queue 514, 516 stores less than a threshold amount of random data, the clock can be provided to the DRNG 106 so that the DRNG 106 can supply the RNG queue 514, 516 with random data. When all RNG Queues 514, 516 are full, the clock to the DRNG 100 can again be turned off.

Furthermore, if a processor core 502, 504 is in a low-power (sleep) mode and then returns to full power mode, there is no additional latency for the processor core 502, 504 to receive random data from the RNG Queue 514, 516 because the clock continues to be provided to the RNG Queue 514, 516 while the processor core 502, 504 is in sleep mode.

In the embodiment shown in FIG. 5, the deterministic random number generator 100 is a shared resource because it is shared by multiple processor cores 502, 504. In addition to being shared by multiple processor cores 502, 504, the deterministic random number generator 100 is shared amongst multiple hardware threads per processor core 502, 504, multiple virtual machines in the system, multiple operating systems across multiple virtual machines and multiple applications per operating system.

Another nondeterministic behavior is consumption from a shared resource. The asynchronous behavior and dynamic consumption rates of consumers (for example, an application program or thread) make which consumer will get which sample from the output stream of the deterministic random number generator 100 dynamically unpredictable and adds disruption to the visibility, by any single consumer, of the sequence of outputs from the deterministic random number generator 100.

Several consumption-based factors can generate different asynchronous delivery patterns, for example, the "fairness" guarantees over consumption to avoid Denial of Service (DOS)-based "starvation" by multiple consumers; the multiple queues between the deterministic random number generator 100 and consumers, particularly if depth greater than 1 and the width of entropy consumption (for example, 32 or 64 bits), when incrementally consumed from a single output of a 128 bit deterministic random number generator 100.

Consumption-based factors can also affect the "reseed rate" of the deterministic random bit generator because one of the reseed triggers is deterministic random number generator 100 "quiescence", momentary lapses in dynamic shared consumption cause abrupt unpredictable changes in the sequences of deterministic random number generator 100 output.

The dynamic combination of these nondeterministic behaviors makes it unlikely that, even with knowledge of one or more items of the internal state of the deterministic random number generator 100 allows successful prediction of future outputs of the DRNG 100.

In an embodiment, a macroinstruction (the RDSEED instruction) is provided that can be used by the Operating System Vendors (OSVs) and Independent Software Vendors (ISVs) who need standard compliant NRBG/TRNG generated entropy to seed their software or hardware DRBGs/PRNGs. The read seed instruction microcode 705, 707 for the read seed macroinstruction is stored in the core 702, 704.

In one embodiment, the macroinstruction syntax to read a seed value is defined as follows:
  RDSEED r16/32/64
where 'r32/64' specifies a destination register in which the seed output from the DRNG 100 is stored. The size (number of bits) of the seed data is dependent on the destination register size (for example, 16-bits, 32-bits, 64-bits, or other sizes). In one embodiment, a flag such as an arithmetic carry flag may be used to store a value indicating whether the random bit string stored in a destination register is valid. For example, the state of an arithmetic carry flag indicates whether the value stored in the destination register is entropic, that is, whether (or not), when the RDSEED instruction was executed there was random data available in the RNG Queue. In an embodiment the arithmetic flag bit is zero if entropy was not available. In an embodiment, the RDSEED macroinstruction is available for use in all privilege levels and all operating modes of the processor 500.

In an embodiment, a macroinstruction (the RDRAND instruction) is provided that can be used by cryptographic protocols to obtain a random number generated by the DRNG 100. The random number can be used to generate public/private key-pairs. The read random instruction microcode 506, 508 for the read random macroinstruction is stored in the core 502, 504.

In one embodiment, the macroinstruction syntax to read a random number is defined as follows:
  RDRAND r16/32/64
where 'r16/32/64' specifies a destination register in which the random data output from the DRNG 100 is stored. The size (number of bits) of the random data is dependent on the destination register size (for example, 16-bits, 32-bits, 64-bits, or other sizes).

In one embodiment, a flag such as an arithmetic carry flag may be used to store a value indicating whether the random bit string stored in a destination register is valid. For example, the state of an arithmetic carry flag indicates whether the value stored in the destination register is entropic, that is, whether (or not), when the RDRAND instruction was executed there was random data available in the RNG Queue. If no entropy is currently available, a predefined mechanism can be used to retry the RDRAND until entropy becomes available.

The availability of the RDRAND macroinstruction improves performance of the operating system and security-related applications by providing a single instruction to obtain a random number in contrast to each operating system and security-related application having to individually create a source of random numbers. In an embodiment, the RDRAND macroinstruction is available for use in all privilege levels and all operating modes of the processor 500. The DRNG 100 also provides random numbers for use by internal microcode (μCode) functions, for example, microcode functions that use random numbers.

In an embodiment, the DRNG (both NRBG and DRBG and their states) are protected from a software attack Shared Resource across "n" processor cores, threads, Virtual Machines (VMs), and applications in the system. The Digital Random Number Generator scales under multiple consumer load power management and has a self scheduling, compute ahead, low latency, consumption driven, queued interface.

Figure 6:
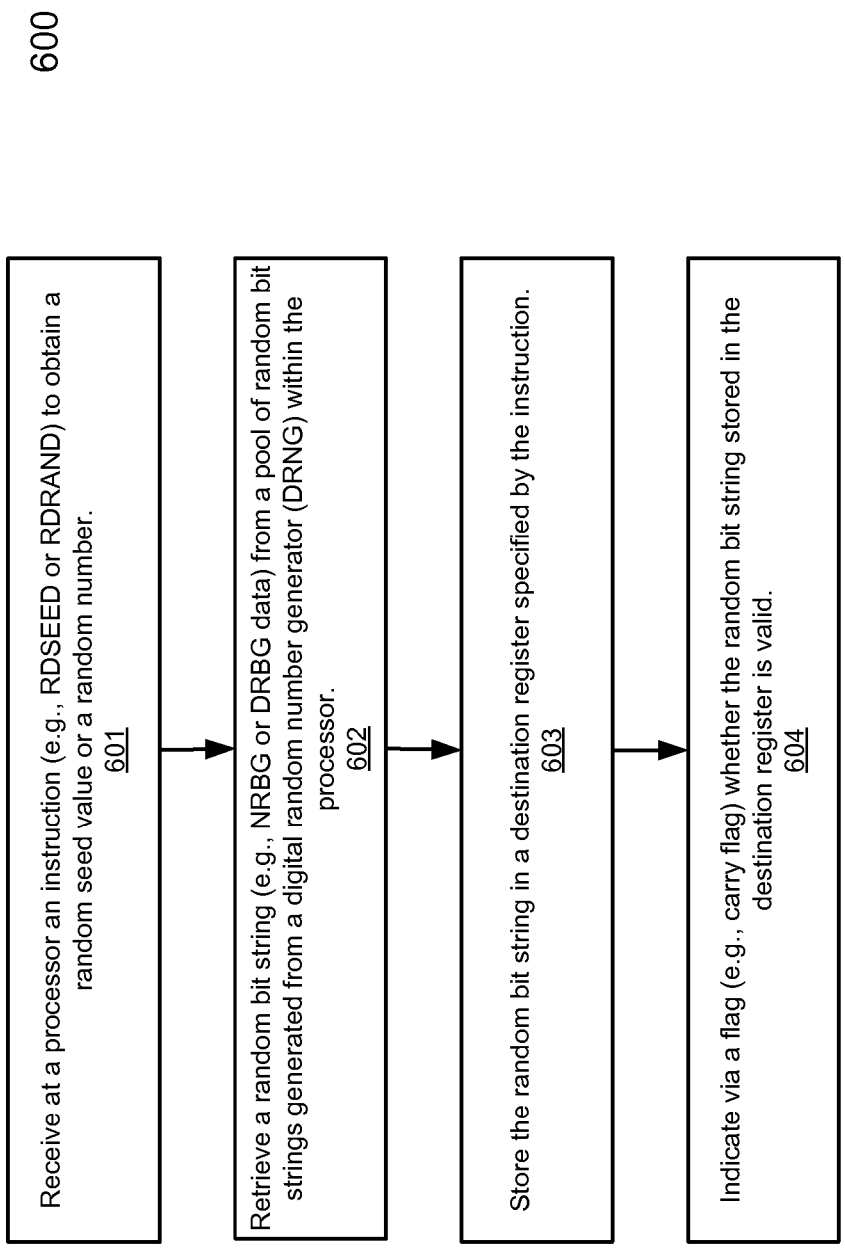
FIG. 6 is a flow diagram illustrating a method to processing an instruction to obtain a random bit string according to one embodiment.

FIG. 6 is a flow diagram illustrating a method to processing an instruction to obtain a random bit string according to one embodiment. Method 600 may be performed by processor 500 of FIG. 5. Referring to FIG. 6, at block 601, a processor receives an instruction (e.g., RDSEED or RDRAND) to obtain a deterministic random value (e.g., random number) or a nondeterministic random value (e.g., seed). At block 602, in response to the instruction, the processor retrieves a random bit string from a pool of random bit strings (e.g., DRBG or NRBG output buffers) generated from a DRNG within the processor. At block 603, the retrieved random bit string is stored in a destination register specified by the instruction. At block 604, optionally, a flag is updated to indicate whether the random bit string stored in the destination register is valid.

Figure 7:
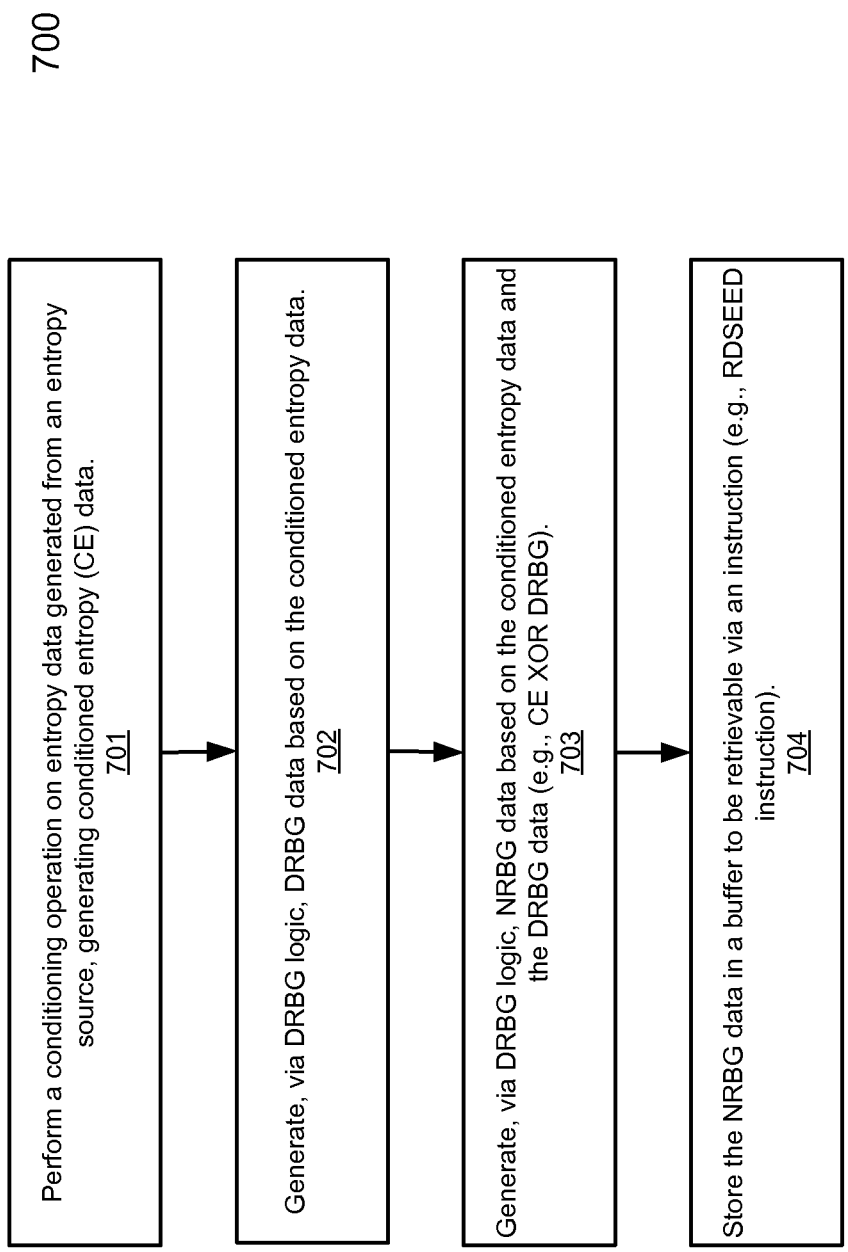
FIG. 7 is a flow diagram illustrating a method to generate a random bit string according to one embodiment.

FIG. 7 is a flow diagram illustrating a method to generate a random bit string according to one embodiment. Method 700 may be performed by processor 500 of FIG. 5. Method 700 may be performed independently with respect to method 600. Referring to FIG. 7, at block 701, a conditioner performs a conditioning operation on entropy provided by an entropy source to generate conditioned entropy data. At block 702, DRBG logic generates DRBG data based on the conditioned entropy data. At block 703, NRBG logic generates NRBG data based on the DRBG and the conditioned entropy data. In one embodiment, the NRBG data is generated by XORing the DRBG data and the conditioned entropy data. At block 704, the NRBG data is then stored in a buffer (e.g., NRBG FIFO 310 of FIG. 3) to be retrievable via an instruction (e.g., RDSEED).

Figure 8:
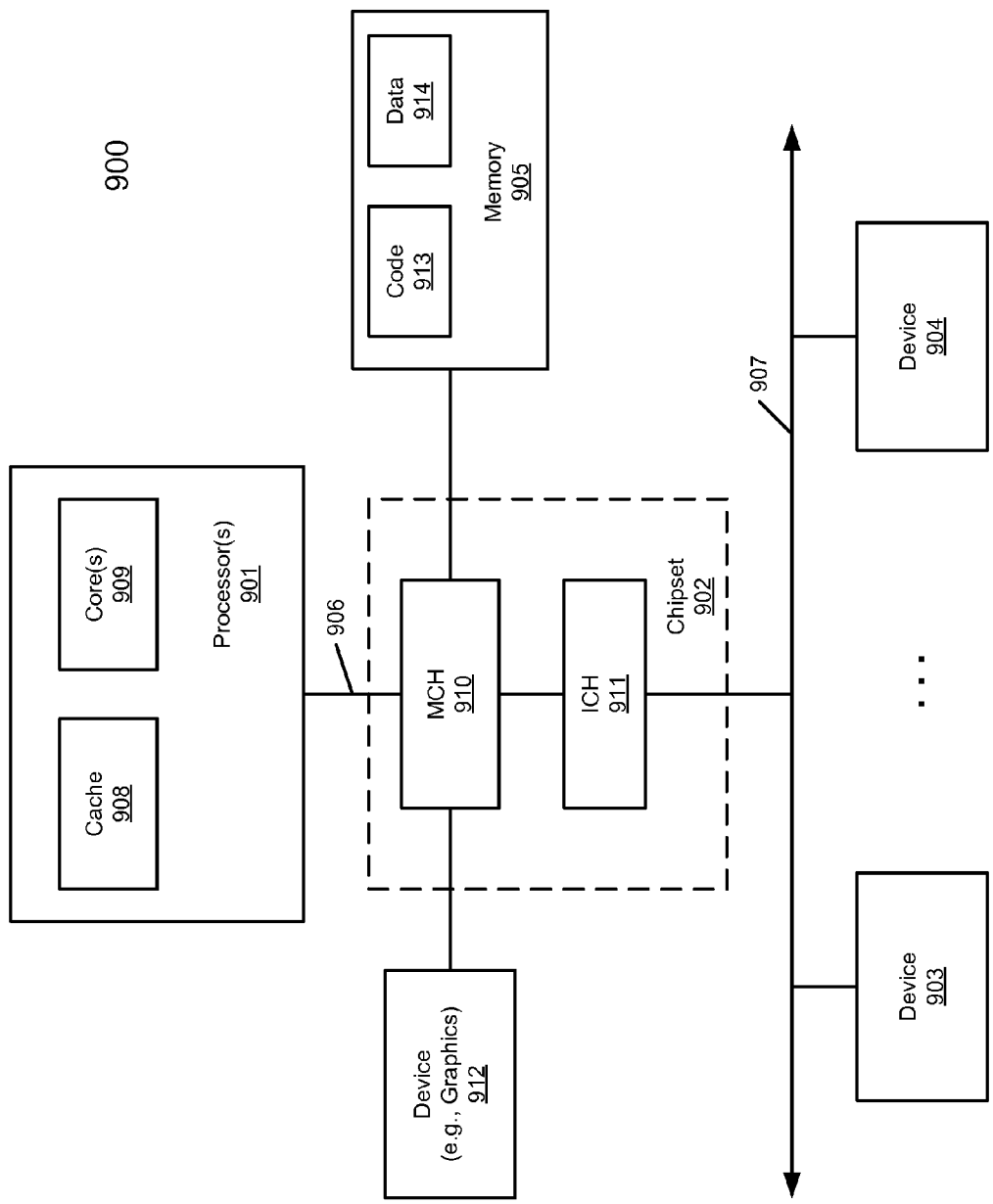
FIG. 8 is a block diagram illustrating a data processing system which may be used with an embodiment of the invention.

FIG. 8 is a block diagram illustrating an example of a data processing system according to one embodiment of the invention. System 900 may represent any of the systems described above. For example, processor 901 may represent processor 500 of FIG. 5. System 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 8 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 8, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™, Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc.

Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 9:
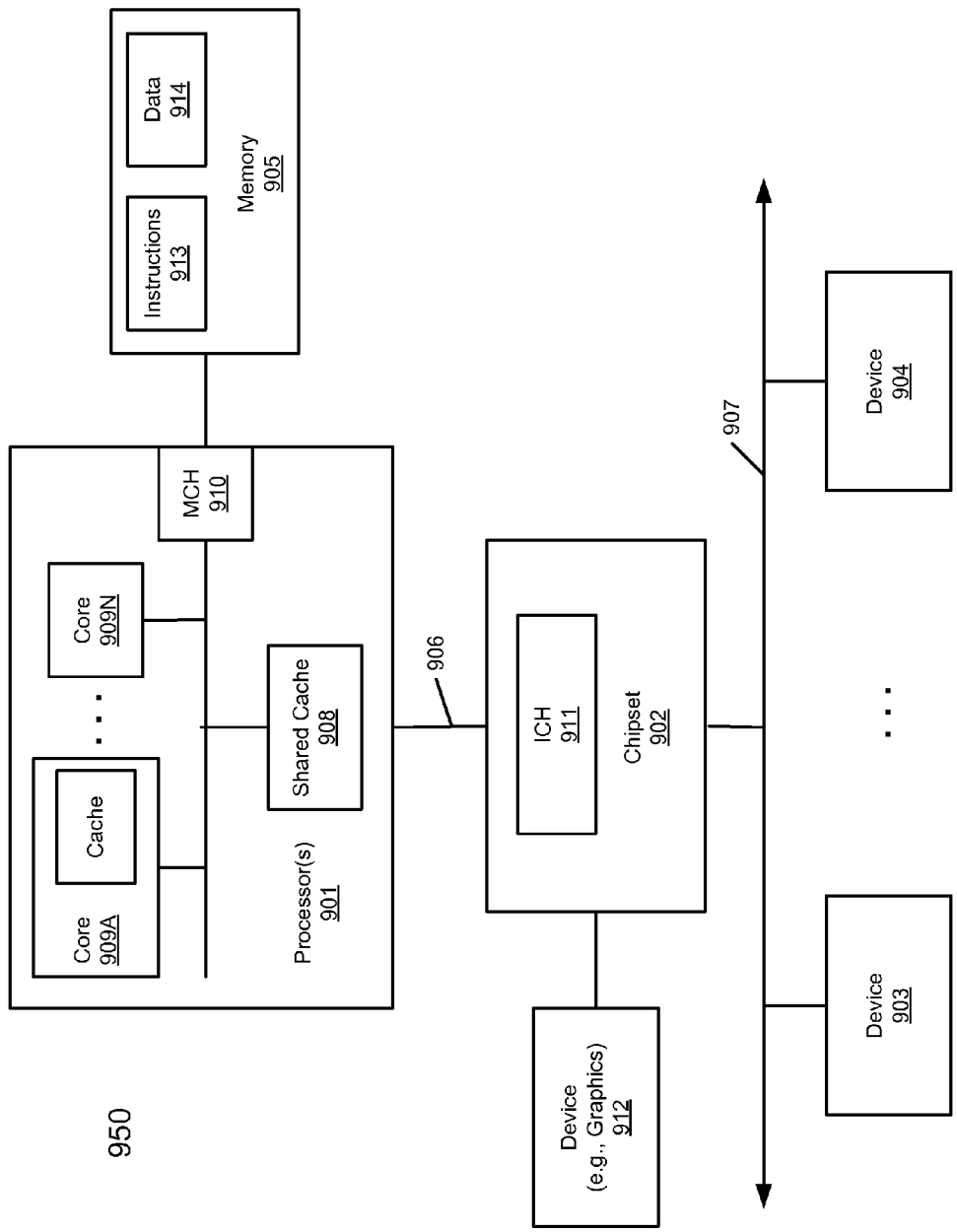
FIG. 9 is a block diagram illustrating a data processing system which may be used with another embodiment of the invention.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 9. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:
1. An apparatus, comprising:
an interconnect;
a digital random number generator (DRNG) circuit to condition entropy data provided by an entropy source, to generate and output a plurality of deterministic random bit (DRB) strings, and to generate and output a plurality of nondeterministic random bit (NRB) strings, wherein the plurality of DRB and NRB strings are distinct strings;

an execution unit circuit coupled to the DRNG circuit, in response to a first instruction to read a seed value, to retrieve one of the NRB strings from the DRNG and to store the NRB string in a destination register specified by the first instruction, and in response to a second instruction to read a random number, to retrieve one of the DRB strings from the DRNG circuit and to store the DRB in a destination register specified by the second instruction; and a flag register to store a flag set by the execution unit to indicate whether the NRB string stored in the destination register is valid.

2. The apparatus of claim 1, wherein the DRNG circuit comprises:

a conditioner to condition the entropy data provided by the entropy source to generate conditioned entropy (CE) data;

a DRB generator (DRBG) coupled to the conditioner to generate the DRB strings based on the CE data; and an NRB generator (NRBG) coupled to the conditioner and the DRBG to generate the NRB strings based on the DRB strings and the CE data.

3. The apparatus of claim 2, wherein the NRBG comprises an exclusive OR (XOR) logic to perform an XOR operation on the DRB strings and the CE data to generate the NRB strings.

4. The apparatus of claim 2, further comprising:

a conditional entropy buffer to store the CE data;

a DRBG buffer to store the DRB strings; and an NRBG buffer to store the NRB strings.

5. The apparatus of claim 4, wherein the DRBG circuit is configured to automatically generate more DRB strings when a number of the DRB strings stored in the DRBG buffer drops below a first predetermined threshold.

6. The apparatus of claim 4, wherein the NRBG is configured to automatically generate more NRB strings when a number of the NRB strings stored in the NRBG buffer drops below a second predetermined threshold.

7. A system, comprising:

an interconnect;

a processor coupled the interconnect, the processor including a digital random number generator (DRNG) circuit to condition entropy data provided by an entropy source, to generate and output a plurality of deterministic random bit (DRB) strings, and to generate and output a plurality of nondeterministic random bit (NRB) strings, wherein the plurality of DRB and NRB strings are distinct strings, an execution unit circuit coupled to the DRNG circuit, in response to a first instruction to read a seed value, to retrieve one of the NRB strings from the DRNG circuit and to store the NRB string in a destination register specified by the first instruction, and in response to a second instruction to read a random number, to retrieve one of the DRB strings from the DRNG circuit and to store the DRB in a destination register specified by the second instruction, and a flag register to store a flag set by the execution unit to indicate whether the NRB string stored in the destination register is valid; and a dynamic random access memory (DRAM) coupled to the interconnect.

8. The system of claim 7, wherein the DRNG circuit comprises:

a conditioner to condition the entropy data provided by the entropy source to generate conditioned entropy (CE) data;

a DRB generator (DRBG) coupled to the conditioner to generate the DRB strings based on the CE data; and an NRB generator (NRBG) coupled to the conditioner and the DRBG to generate the NRB strings based on the DRB strings and the CE data.

* * * * *